United States Patent
Ma et al.

(10) Patent No.: US 6,779,884 B1
(45) Date of Patent: Aug. 24, 2004

(54) INK-JET PRINTING METHODS AND SYSTEMS PROVIDING DRY RUB RESISTANCE

(75) Inventors: Zeying Ma, San Diego, CA (US); Gregg A Lane, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/396,045

(22) Filed: Mar. 24, 2003

(51) Int. Cl.$^7$ .................................................. B41J 2/01
(52) U.S. Cl. ........................ 347/101; 347/96; 347/100
(58) Field of Search .......................... 347/100, 96, 95, 347/101, 102, 105; 106/31.13, 31.6; 101/416.1; 428/195

(56) References Cited

U.S. PATENT DOCUMENTS

| | | | |
|---|---|---|---|
| 5,643,984 A | | 7/1997 | Mueller et al. |
| 5,990,202 A | | 11/1999 | Nguyen et al. |
| 6,204,307 B1 | | 3/2001 | Miyabayashi |
| 6,248,161 B1 | | 6/2001 | Nguyen et al. |
| 6,283,589 B1 | * | 9/2001 | Gelbart ........................ 347/101 |
| 6,328,408 B1 | * | 12/2001 | Gelbart ........................ 347/101 |
| 6,439,708 B1 | * | 8/2002 | Kato et al. ................... 347/100 |
| 6,498,222 B1 | * | 12/2002 | Kitamura et al. ............ 347/100 |
| 6,585,365 B1 | * | 7/2003 | MacMillan ................... 347/100 |
| 2002/0075370 A1 | * | 6/2002 | Szlucha ........................ 347/101 |

FOREIGN PATENT DOCUMENTS

| | | |
|---|---|---|
| EP | 1041126 | 10/2000 |
| EP | 1167046 A1 | 1/2002 |
| WO | WO 99/23182 | 5/1999 |
| WO | WO 01/46325 | 6/2001 |

* cited by examiner

Primary Examiner—Stephen D. Meier
Assistant Examiner—Manish Shah

(57) ABSTRACT

Systems and methods for providing dry rub resistance and reduced dry rub transfer are provided. Specifically, a system for printing durable ink-jet images having good dry rub resistance can include a substrate, a first ink-jet pen, and a slip component. The first ink-jet pen can contain an ink-jet ink configured for being jetted onto the substrate and can include a first liquid vehicle, and an effective amount of a pigment colorant. The slip component can be configured for being coated over the ink-jet ink once jetted onto the substrate. In one embodiment, the ink-jet ink can further include an effective amount of a latex. In another embodiment, a fixer composition can be used for overprinting or underprinting with respect to the ink-jet ink. A method of the present invention can utilize the above system.

42 Claims, No Drawings

INK-JET PRINTING METHODS AND SYSTEMS PROVIDING DRY RUB RESISTANCE

FIELD OF THE INVENTION

The present invention is drawn to the area of ink-jet imaging. More specifically, the present invention is drawn to pigment-based inkjet ink methods and systems that provide improved image durability, including improved dry rub resistance.

BACKGROUND OF THE INVENTION

Inkjet printing has become a popular way of recording images on various media surfaces, particularly paper. Some of these reasons include low printer noise, capability of high-speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, media flexibility, etc.

In general, ink-jet inks are either dye- or pigment-based inks. Both are typically prepared in a liquid vehicle that contains the dye and/or the pigment. Dye-based ink-jet inks generally use a liquid colorant that is usually water-based to turn the media a specific color. Conversely, pigmented inks typically use a solid or dispersed colorant to achieve color.

Many properties that are desirable for inkjet printing include good edge acuity and optical density of an image on a media substrate, good dry time of the ink on the substrate, adhesion to the substrate, lack of deviation of ink droplets when fired, presence of all dots, resistance of the ink after drying to water and other solvents, long-term storage stability, good dot size and dot gain, color-to-color bleed alleviation, acceptable coalescence, long term reliability without corrosion or nozzle clogging, good lightfastness, good waterfastness, low humid hue shift, and other known properties. Many inks are known to possess some of the above described properties. However, few inks are known that possess all of these properties, since an improvement in one property often results in degradation of another property. Accordingly, investigations continue into developing ink formulations that have improved properties and that do not improve one property to the significant detriment of another.

When compared to dye-based ink jet inks, pigmented inkjet inks typically provide superior text quality, line edge acuity, and image durability in many areas including lighfastness and waterfastness. However, pigmented inks, particularly when printed on smooth surfaces such as offset coated media, have poor dry rub resistance. This is a problem that needs to be overcome.

SUMMARY OF THE INVENTION

It has been recognized that the use of certain components in ink-jet ink systems can provide good image permanence and smudge resistance, including dry rub resistance. It has also been recognized that certain components for use in such systems can be formulated for use with good reliability using an ink-jet pen. It has also been recognized that a method of providing smudge resistant images using the above system, or a like system, would be advantageous in the art.

Specifically, a system for printing durable ink-jet images having good rub resistance can comprise a substrate, a first ink-jet pen, and a slip component. The first ink-jet pen can contain an ink-jet ink configured for being jetted onto the substrate and can comprise a first liquid vehicle, and an effective amount of a pigment colorant. The slip component can be configured for being coated over the ink-jet ink once the ink-jet ink is jetted onto the substrate.

In an alternative embodiment, a method of printing a durable ink-jet ink image can comprise the steps of jetting a pigment-based ink-jet ink onto a substrate to form a printed image, and overcoating the image with a slip compound.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 wt % to about 5 wt %" should be interpreted to include not only the explicitly recited concentration of about 0.1 wt % to about 5 wt %, but also include individual concentrations and the sub-ranges within the indicated range. Thus, included in this numerical range are individual concentrations such as 1 wt %, 2 wt %, 3 wt %, and 4 wt %, and sub-ranges such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than about 5 wt %" should be interpreted to include all values and sub-ranges between 0 wt % and 5 wt %. Furthermore, such an interpretation should apply regardless of the breadth of the range or the characteristics being described.

As used herein, "effective amount" refers to the minimal amount of a substance or agent, which is sufficient to achieve a desired effect. For example, an effective amount of a "liquid vehicle" is at least the minimum amount required for use in an ink composition or a fixer composition of the present invention, while maintaining properties in accordance with embodiments of the present invention.

The term "substantially" when used with another term shall include from mostly to completely.

As used herein, "liquid vehicle" refers to (a) the fluid in which pigments and latex colloids are dispersed to form ink-jet inks for thermal or other ink-jet ink applications, (2) the fluid in which cationic component or polymers are dispersed to form fixer compositions for thermal ink-jet ink applications, or (3) the fluid which a slip compound is dispersed or is present as part of an emulsion. Many liquid vehicles and vehicle components are known in the art. Typical ink vehicles can include a mixture of a variety of different agents, such as surfactants, solvents, co-solvents, buffers, biocides, sequestering agents, viscosity modifiers, surface-active agents, and water.

The term "latex" or "latex-containing colloidal suspensions" refers to liquid suspensions comprising a liquid (such as water or another liquid) and polymeric particulates from 20 nm to 500 nm (or from 100 nm to 300 nm) in size, and have a weight average molecular weight from about 10,000 Mw to 2,000,000 Mw (or from about 40,000 Mw to 100,000 Mw). Typically, the polymeric particulate will be present in the liquid at from 0.2 wt % to 15 wt % by solids in the suspension. To the suspension can be added other liquid vehicle components, latex primers, and pigment solids to form ink-jet ink compositions for use with the present invention. The polymeric particulates of the latex can comprise a plurality of monomers that can be randomly polymerized, and also can be crosslinked. When crosslinked, the molecular weight can be even higher than that cited above. Additionally, the latex component can have a glass transition temperature from about −25° C. to 80° C.

"Latex primer" refers to compositions having from finely dispersed to dissolved polymeric particulates having a maximum size of about 500 nm. Though not required, latex primer can be used with the systems and methods of the present invention to help in stabilization and jettability of the ink-jet ink compositions of the present invention.

"Cationic components," when referring to the dispersants within a fixer composition, refers to cationic polymers, multivalent ions, organic acids, and the like, that are positively charged and act to fix a polymeric particulate component of a latex-containing colloidal suspension within an ink-jet ink upon contact.

"Self-dispersed pigment" refers to pigments that have been chemically surface modified with a charge or a polymeric grouping, wherein the chemical modification aids the pigment in becoming and/or substantially remaining dispersed in a liquid vehicle.

"Polymer-dispersed pigment" refers to pigments that utilize a dispersant (which can be a polymer, an oligomer, or a surfactant, for example) in a liquid vehicle and/or pigments that utilize a physical coating to aid the pigment in becoming and/or substantially remaining dispersed in a liquid vehicle.

"Slip compound" or "slip component" refers to inorganic and organic compositions that can be used to improve dry rub resistance of an inkjet produced image. The term "slip compound" is generally known in the commercial offset printing arts, but has not been typically used with ink-jet printing systems and methods. If an inorganic slip compound is used, then compositions such as talc (magnesium silicates), MgO, $SiO_2$, CaO, $Fe_2O_3$, and $Al_2O_3$ can be used in effective amounts. If an organic slip compound is used, then compositions such as polytetrafluoroethylene and organic waxes can be used. Examples of organic waxes include polyethylene waxes, petroleum waxes, paraffins, carnauba waxes, polypropylene waxes, crystalline and microcrystalline waxes, and/or amide waxes (oleamide, stearamide, erucamide, cyclic amide, etc.).

"Dry rub resistance" refers to the ability of a printed image to resist appearance degradation upon dry rubbing the image. Good dry rub resistance, upon rubbing, will tend to not transfer ink from a printed image to surrounding areas where the ink has not been printed, i.e., on another printed color or on the paper or other substrate.

"Dry rub transfer" is defined as the amount of inkjet ink that is transferred from a printed image to a device used to test the dry rub resistance of the printed image. For example, white paper can be placed on a rubbing device, which can be easily tested for transfer from the printed image to the rubbing device.

With this in mind, the present invention is drawn to the area of inkjet imaging. More specifically, the present invention is drawn to systems and methods of printing wherein a smudge resistant and permanent image can be obtained that exhibits excellent dry rub resistance, and optionally, reduced dry rub transfer, even when printed on substantially nonporous media, e.g., offset media.

In one embodiment of the present invention, a system for printing durable ink-jet images having good rub resistance can comprise a substrate, a first ink-jet pen containing a pigment-based inkjet ink, and a slip component. The first ink-jet pen containing an inkjet ink can be configured for being jetted onto the substrate, and can comprise a first liquid vehicle, and an effective amount of a pigment colorant. The slip component can be configured for being coated over the ink-jet ink, once the inkjet ink is jetted onto the substrate.

In an alternative embodiment, a method of printing a durable ink-jet ink image can comprise the steps of jetting a pigment-based ink-jet ink onto a substrate to form a printed image, and overcoating the image with a slip compound.

With respect to both the systems and methods described herein, various embodiments can be implemented. In one embodiment, the substrate for use can be a substantially nonporous substrate material, such as commercial offset media. Commercial offset media is commonly used in the offset printing industry where the inks used are quite different than those typically used in the inkjet ink industry. In fact, most ink-jet inks perform poorly on offset media. However, by using a pigment-based ink-jet ink and overcoating it with a slip component in accordance with the present invention, images can be produced that exhibit a surprisingly good dry rub resistance.

Various types of pigments can also be used, such as self-dispersed pigments and/or polymer dispersed pigments. If a polymer-dispersed pigment is used, then the liquid vehicle can further comprise a dispersing agent, or the pigment can be physically coated with a dispersing agent.

Optionally, in addition to the pigment and the liquid vehicle, the inks can also include an anionic or neutral latex-containing colloidal suspension. Such a suspension can comprise polymeric particulates dispersed in water or another liquid. In one embodiment, the polymeric particulates can have a particle size range from about 20 nm to 500 nm, and can comprise a plurality of randomly polymerized monomers that are from about 10,000 Mw to 2,000,000 Mw. When mixed with the ink-jet ink, the water or liquid of the suspension will mix with the liquid vehicle of the ink-jet ink, and the polymeric particulates of the latex-containing colloidal suspension can be present in the ink-jet ink at from 0.2 wt % to 15 wt % by solids. Alternatively, the latex can be in a fluid separate from the ink-jet ink, and can be overprinted and/or underprinted with respect to the ink-jet ink. Whether the latex-containing colloidal suspension is present or not, the pigment colorant can be present in the ink-jet ink at from 0.5 wt % to 6 wt %.

There are a number of compositions that can make up the polymeric particulates of the latex-containing colloidal suspensions, including randomly polymerized monomers. To illustrate by example, the plurality of randomly polymerized monomers can include various combinations of methyl methacrylate, methacryloyloxy ethyl succinate, ethylene glycol dimethacrylate, methacrylic acid, acrylic acid, itaconic acid, ethyl acrylate, ethyl methacrylate, benzyl acrylate, benzyl methacrylate, propyl acrylate, propyl methacrylate, hexyl acrylate, hexyl methacrylate, butyl acrylate, butyl methacrylate, octadecyl acrylate, octadecyl methacrylate, hydroxy ethyl acrylate, hydroxy ethyl methacrylate, hydroxy hexyl acrylate, hydroxy hexyl methacrylate, phenethyl acrylate, phenethyl methacrylate, vinyl propyl ketone, vinyl hexyl ketone, cyclohexyl acrylate, isopropyl acrylate, isopropyl methacrylate, isobutyl acrylate, isobutyl methacrylate, trifluoromethyl acrylate, trifluoromethyl methacrylate, trifluoro propyl acrylate, trifluoro propyl methacrylate, 2-ethylhexyl acrylate, 2-ethylhexyl methacrylate, iso-octyl acrylate, and iso-octyl methacrylate. Other suitable monomers that can be used are described in WO 99/23182, which is incorporated herein by reference.

Though the systems and methods described herein provide good dry rub resistance without the use of a fixer composition, optionally, a fixer composition can be overprinted or underprinted with respect to the ink-jet ink to provide improved dry rub transfer. If a fixer composition is used, then it is typically applied by a second ink-jet pen. In other words, the method, using the system, can be carried out by overprinting the fixer composition atop the latex-containing ink-jet ink. Alternatively, the method, using the system, can be carried out by underprinting the fixer composition beneath the latex-containing ink-jet ink. A combination of these embodiments can also be utilized for desired results. Such a fixer composition, if used, can comprise a second liquid vehicle and an effective amount of a cationic polymer, such as poly(vinyl pyridine) salts, polyalkylaminoethyl acrylates, polyalkylaminoethyl methacrylates, poly(vinyl imidazole), polyethyleneimines, polybiguanides, and polyguanides, and combinations thereof. In some embodiments, the fixer composition can further comprise multivalent salts, such as multivalent metal nitrates, EDTA salts, phosphonium halide salts, organic acids, and combinations thereof. The cationic polymer can be present in the second liquid vehicle at from 0.2 wt % to 15 wt % by solids.

With respect to the systems and methods described herein, a slip component can be used to provide dry rub resistance. The slip component can be an inorganic powder, such as talc (magnesium silicate such as $Mg_3Si_4O_{10}(OH)_2$ also referred to as $Mg_3H_2(SiO_3)_4$). Other inorganic powders that can be used include MgO, $SiO_2$, CaO, $Fe_2O_3$, and $Al_2O_3$. The slip component can also be an organic component or particulate, such as an organic wax. Other suitable organic components include polyethylene waxes, polytetrafluoroethylene, fatty acids, oleamides, stearamides, erucamides, cyclic amides, petroleum waxes and jellies, paraffin, microcrystalline waxes, and combinations thereof. The slip component can be overcoated onto the printed image itself, and can also be overcoated on areas surrounding the printed image. Application can be by any of a number of methods, including dispersing in a liquid vehicle and jetting, spraying, or rolling, as well as puffing as a dry powder, etc.

With respect to both the first liquid vehicle for use with the ink-jet ink, and the optional second liquid vehicle for use with the fixer composition, any of a number of components can be present that are effective for use with thermal ink-jet ink technologies. For example, the liquid vehicle of the ink or the fixer can comprise an effective amount of water, from 0.05 wt % to 5 wt % of a surfactant, from 5 wt % to 50 wt % of a solvent, from 0.02 wt % to 2 wt % of a biocide. Other components can also be present as described with respect to liquid vehicle components herein. Multiple liquid vehicle components of a single class can also be present, such as multiple solvents, multiple surfactants, etc. With respect to the latex-containing colloidal suspension containing inkjet ink, optionally, from 0.1 wt % to 5 wt % by solids of a latex primer can also be present in the liquid vehicle.

Adding latex to pigmented inks alone can improve, to some degree, the smudge and smear resistance in the absence of the overcoated slip component. Due to the enhanced penetration effectuated by the presence of the latex, color strength of a printed image can become decreased, as evidenced by a reduction in optical density (OD). Fixer, on the other hand, can stop undesired penetration of ink-jet inks, but alone is not known to provide substantial durability when used with conventional thermal ink-jet ink systems. By combining the use of a pigment/latex-containing ink-jet ink with the use of a fixer composition that is configured for interacting with the pigment and/or the latex component of the ink-jet ink, smudge and smear resistance can be greatly decreased while maintaining good color strength. In addition, by overcoating with a slip component, dry rub resistance can be improved. This enhanced smear, smudge, and dry rub resistance, as well as the maintaining of good color strength, is noticeable upon partial drying when images are produced using the systems and methods of the present invention. Though these components are described for use together to provide more desirable results, none of the elements described herein should be considered to be critical to obtaining improved results.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Preparation of Pigment- and Latex-containing Ink-jet Inks

An inkjet ink was prepared according to Table 1a below:

TABLE 1a

| Ink-jet ink compositions (prior to addition of latex) | |
|---|---|
| Ingredients | Wt % |
| Glycereth-27 | 3 |
| 2-pyrrolidinone | 6 |
| Glycerol | 5 |
| 1,2-hexanediol | 4 |
| Nonionic surfactant | 0.75 |
| Neopentyl alcohol | 0.75 |
| Fluorinated surfactant | 0.2 |
| Biocide | 0.2 |
| Polymer dispersed magenta pig. | 3 |
| Deionized water | Balance |

The ink-jet ink of Table 1a was divided into eight samples (1–8), and to each ink-jet ink samples was added a different amount of latex. Specifically, the following amounts of latex were added to each of the eight ink-jet ink samples, as shown in Table 1b below:

TABLE 1b

Amount of latex added to each ink-jet ink sample

| Ink-jet Ink Sample No. | Latex I wt % | Latex II (primer) wt % | Total Latex (I + II) wt % |
|---|---|---|---|
| 1 | 0.00 | 0.00 | 0.00 |
| 2 | 1.00 | 0.33 | 1.33 |
| 3 | 2.00 | 0.67 | 2.67 |
| 4 | 3.00 | 1.00 | 4.00 |
| 5 | 4.00 | 1.33 | 5.33 |
| 6 | 5.00 | 1.67 | 6.67 |
| 7 | 6.00 | 2.00 | 8.00 |
| 8 | 6.50 | 2.17 | 8.67 |

Example 2

Preparation of PEI/$Ca^{2+}$ Fixer Compositions

A polyethyleneimine/calcium ion-containing fixer composition was prepared according to Table 2 as follows:

TABLE 2

PEI/$Ca^{2+}$ fixer composition

| Ingredients | Wt % |
|---|---|
| ethoxylated trimethylnonanol | 0.45 |
| olefin sulfonate | 0.2 |
| 2-pyrrolidone | 5 |
| Alkyl Diol | 10 |
| Polyethyleneimine | 5 |
| Calcium Nitrate.4$H_2O$ | 2.5 |
| Deionized water | Balance |
| Total | 100 |

*PH adjusted to 4.0 with NaOH or $HNO_3$

Example 3

Dry Rub Resistance

The eight ink-jet inks samples (1–8) set forth in Table 2 (0–8.67 wt %) were each printed as bar patterns in four locations (a–d) on Lustro Laser offset paper (from Sappi of Boston, Mass.) to provide four printed samples for each ink-jet ink. The total number of printed samples was 32 (1a, 1b, 1c, 1d, 2a, 2b, . . . 8c, 8d). Each of the four ink-jet ink samples for all of the inks was treated (or untreated) in four ways, as follows:

(a) Sample was not underprinted with fixer, and was not overcoated with talc.
(b) Sample was underprinted with the fixer composition of Example 2, and was not overcoated with talc.
(c) Sample was not underprinted with fixer, and was overcoated with talc.
(d) Sample was underprinted with the fixer composition of Example 2, and was overcoated with talc.

The talc used was powdered magnesium silicate, which was puffed onto the printed image as well as the surrounding offset paper substrate. Table 3 below provides the dry rub resistance results as of 24 hours after printing. The dry rub resistance testing was conducted with a Sutherland Rub Tester using a 4 LB-hammer having HP bright white paper attached to the contact point between the hammer and the printed image.

TABLE 3

Latex concentration/fixer/talc present compared to number of rubs to failure

| Ink-jet Ink Sample No. (Ex. 1) | (a) No Fixer No Talc (# Rubs) | (b) With Fixer No Talc (# Rubs) | (c) No Fixer With Talc (# Rubs) | (d) With Fixer With Talc (# Rubs) |
|---|---|---|---|---|
| 1 | 25 | 7 | 400 | 400 |
| 2 | 25 | 20 | 400 | 400 |
| 3 | 25 | 15 | 400 | 400 |
| 4 | 30 | 25 | 400 | 400 |
| 5 | 50 | 15 | 400 | 400 |
| 6 | 40 | 25 | 400 | 400 |
| 7 | 40 | 20 | 400 | 400 |
| 8 | 70 | 40 | 400 | 400 |

As shown in Table 3 above, the dry rub resistance of compositions having the highest latex concentration (highest wt %) produced images that failed after about 60–70 rubs, regardless of whether a fixer was present or not. However, if talc was puffed onto the printed area (with or without the presence of a fixer) the image surpassed 400 rubs without failing. Failure was determined when the printed image exhibited smear to non-imaged areas upon dry rubbing as described above. Though the presence of fixer did not significantly affect the dry rub resistance, it can be added to provide other benefits, including control of bleed and coalescence, as well as providing reduced dry rub transfer.

Example 4

Dry Rub Transfer

The eight ink-jet inks of Example 1 (0–8.67 wt %) were each printed in two locations (bar patterns) on Lustro Laser offset paper to provide two printed samples for each ink-jet ink (totaling 16 printed samples for all ink-jet inks). One sample of each of the ink-jet inks (1–8) was (a) not underprinted with any fixer composition. The other sample of each of the ink-jet inks (1–8) was (b) unprinted with the fixer composition of Example 2. All samples were overcoated with a powdered magnesium silicate talc. Though the presence of fixer composition was not shown to be significant with respect to dry rub resistance (as shown in Table 3 above), the presence of fixer was shown to play a role in dry rub transfer, as shown below in Formula 4:

TABLE 4

Latex concentration and affect of fixer on dry rub transfer

| Ink-jet Ink Sample No. (Ex. 1) | (a) No Fixer | | (b) With Fixer | |
|---|---|---|---|---|
| | Bar OD | Transfer mOD | Bar OD | Transfer mOD |
| 1 | 1.12 | 120 | 1.49 | 160 |
| 2 | 1.47 | 110 | 1.35 | 160 |
| 3 | 1.49 | 60 | 1.34 | 60 |
| 4 | 1.47 | 50 | 1.25 | 70 |
| 5 | 1.6 | 50 | 1.3 | 30 |
| 6 | 1.29 | 60 | 1.31 | 20 |
| 7 | 1.37 | 60 | 1.27 | 40 |
| 8 | 1.28 | 40 | 1.24 | 20 |

Bar OD values provide the optical density of the printed bars for each of the 16 ink-jet ink samples printed. The mOD values provided indicate the amount of ink-jet ink that is transferred from the printed samples (bars) to the HP bright white ink-jet plain paper attached to the hammer of the Sutherland Rub Tester described in Example 3. Thus, a higher mOD indicates more transfer, and a less desirable result.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A system for printing durable ink-jet images having good rub resistance, comprising:
   a) a substrate;
   b) a first ink-jet pen containing an ink-jet ink, said ink-jet ink configured for being jetted onto the substrate, said ink-jet ink comprising
      i) a first liquid vehicle, and
      ii) an effective amount of a pigment colorant,
   c) a slip component configured for being coated over the ink-jet ink once jetted onto the substrate, said slip component including an inorganic powder or polytetrafluoroethylene.

2. A system as in claim 1, wherein the substrate is commercial offset media.

3. A system as in claim 1, wherein the ink-jet ink further comprises an anionic or neutral latex-containing colloidal suspension.

4. A system as in claim 1, wherein the pigment colorant is present at from 0.5 wt % to 10 wt %.

5. A system as in claim 3, wherein the anionic or neutral latex-containing colloidal suspension is present at from 0.2 wt % to 15 wt % by solids.

6. A system as in claim 1, further comprising a second ink-jet pen containing a fixer composition, said fixer composition comprising a second liquid vehicle, and an effective amount of a cationic component.

7. A system as in claim 6, wherein the fixer composition further comprises a multivalent salt selected from the group consisting of multivalent metal nitrates, EDTA salts, phosphonium halide salts, and combinations thereof.

8. A system as in claim 6, wherein the fixer composition comprises an organic acid.

9. A system as in claim 6, wherein the cationic component is from 0.2 wt % to 15 wt % by solids of a cationic polymer.

10. A system as in claim 6, wherein the second ink-jet pen is configured to jet the fixer composition onto the substrate, and wherein the first ink-jet pen is configured to jet the ink-jet ink onto the fixer composition that is on the substrate.

11. A system as in claim 6, wherein the cationic component is a cationic polymer selected from the group consisting of poly(vinyl pyridine) salts, polyalkylaminoethyl acrylates, polyalkylaminoethyl methacrylates, poly(vinyl imidazole), polyethyleneimines, polybiguanides, and polyguanides, and combinations thereof.

12. A system as in claim 3, wherein the latex-containing colloidal suspension comprises polymeric particulates having a particle size range from about 20 nm to 500 nm, said polymeric particulates comprising a plurality of randomly polymerized monomers that are from about 10,000 Mw to 2,000,000 Mw.

13. A system as in claim 1, wherein the slip component is a magnesium silicate talc.

14. A system as in claim 1, wherein the slip component is selected from the group consisting of MgO, $SiO_2$, CaO, $Fe_2O_3$, $Al_2O_3$, and combinations thereof.

15. A system as in claim 1, wherein the slip component is polytetrafluoroethylene.

16. A system as in claim 1, wherein the slip component is configured for being coated over the ink-jet ink by a fluid-jetting process.

17. A system as in claim 1, wherein the slip component is configured for being coated over the ink-jet ink by a dry puffing process.

18. A method of printing a durable ink-jet ink image, comprising:
   a) jetting a pigment-based ink-jet ink onto a substrate to form a printed image, and
   b) overcoating the image with a slip compound, said slip compound including an inorganic powder or polytetrafluoroethylene.

19. A method as in claim 18, wherein the substrate is commercial offset media.

20. A method as in claim 18, wherein the pigment-based ink-jet ink further comprises an anionic or neutral latex-containing colloidal suspension.

21. A method as in claim 18, wherein the pigment colorant is present at from 0.5 wt % to 6 wt %.

22. A method as in claim 20, wherein the anionic or neutral latex-containing colloidal suspension is preset at from 0.2 wt % to 15 wt % by solids.

23. A method as in claim 18, further comprising the step of over printing or underprinting a fixer composition prior to or after the step of jetting the pigment-based ink-jet ink onto the substrate, said fixer comprising an effective amount of a cationic component.

24. A method as in claim 23, wherein the fixer composition further comprises a multivalent salt selected from the group consisting of multivalent metal nitrates, EDTA salts, phosphonium halide salts, and combinations thereof.

25. A method as in claim 23, wherein the fixer composition comprises an organic acid.

26. A method as in claim 23, wherein the cationic component is from 0.2 wt % to 15 wt % by solids of a cationic polymer.

27. A method as in claim 23, wherein the cationic component is a cationic polymer selected from the group consisting of poly(vinyl pyridine) salts, polyalkylaminoethyl acrylates, polyalkylaminoethyl methacrylates, poly(vinyl imidazole), polyethyleneimines, polybiguanides, and polyguanides, and combinations thereof.

28. A method as in claim 20, wherein the latex-containing colloidal suspension comprises polymeric particulates having a particle size range from about 20 nm to 500 nm, said polymeric particulates comprising a plurality of randomly polymerized monomers that are from about 10,000 Mw to 2,000,000 Mw.

29. A method as in claim 18, wherein the slip component is a magnesium silicate talc.

30. A method as in claim 18, wherein the slip component is selected from the group consisting of MgO, $SiO_2$, CaO, $Fe_2O_3$, $Al_2O_3$, and combinations thereof.

31. A method as in claim 18, wherein the slip component is polytetrafluoroethylene.

32. A method as in claim 18, wherein the step of overcoating the slip component is by fluid jetting the slip component, said slip component being dispersed in a liquid vehicle.

33. A method as in claim 18, wherein the step of overcoating the slip component is by a dry puffing process.

34. A system for printing durable ink-jet images having good rub resistance, comprising:
   a) a substrate;
   b) a first ink-jet pen containing an ink-jet ink, said ink-jet ink configured for being jetted onto the substrate, said ink-jet ink comprising
      i) a first liquid vehicle,
      ii) an effective amount of a pigment colorant, and
      iii) an anionic or neutral latex-containing colloidal suspension comprising polymeric particulates having a particle size range from about 20 nm to 500 nm, said polymeric particulates comprising a plurality of randomly polymerized monomers that are from about 10,000 Mw to 2,000,000 Mw; and
   c) a slip component configured for being coated over the ink-jet ink once jetted onto the substrate.

35. A system as in claim 34, wherein the anionic or neutral latex-containing colloidal suspension is present at from 0.2 wt % to 15 wt % by solids.

36. A system as in claim 34, wherein the slip component is an inorganic powder or polytetrafluoroethylene.

37. A system as in claim 34, wherein the slip component is an organic wax selected from the group consisting of a polyethylene wax, an amide wax, a petroleum wax, a paraffin wax, a crystalline or microcrystalline wax, a carnauba wax, a polypropylene wax, and combinations thereof.

38. A system for printing durable ink-jet images having good rub resistance, comprising:
   a) a substrate;
   b) a first ink-jet pen containing an ink-jet ink, said ink-jet ink configured for being jetted onto the substrate, said ink-jet ink comprising
      i) a first liquid vehicle, and
      ii) an effective amount of a pigment colorant;
   c) a second ink-jet pen containing a fixer composition, said fixer composition comprising a second liquid vehicle, and an effective amount of a cationic component; and
   d) a slip component configured for being coated over the ink-jet ink once jetted onto the substrate.

39. A system as in claim 38, wherein the fixer composition further comprises a multivalent salt selected from the group consisting of multivalent metal nitrates, EDTA salts, phosphonium halide salts, and combinations thereof.

40. A system as in claim 39, wherein the fixer composition comprises an organic acid.

41. A system as in claim 39, wherein the slip component is an inorganic power or polytetrafluoroethylene.

42. A system as in claim 49, wherein the slip component is an organic wax selected from the group consisting of a polyethylene wax, an amide wax, a petroleum wax, a paraffin wax, a crystalline or microcrystalline wax, a carnauba wax, a polypropylene wax, and combinations thereof.

* * * * *